US008121813B2

(12) United States Patent
Ren et al.

(10) Patent No.: US 8,121,813 B2
(45) Date of Patent: Feb. 21, 2012

(54) SYSTEM AND METHOD FOR CLEARANCE ESTIMATION BETWEEN TWO OBJECTS

(75) Inventors: Zhiyuan Ren, Malta, NY (US); Wayne Charles Hasz, Pownal, VT (US); Emad Andarawis Andarawis, Ballston Lake, NY (US); David So Keung Chan, Niskayuna, NY (US); David Mulford Shaddock, Troy, NY (US); John Harry Down, Lanesborough, MA (US); Samhita Dasgupta, Niskayuna, NY (US); William Lee Herron, Cincinnati, OH (US); Cheryl Lynn Herron, legal representative, Cincinnati, OH (US); David Walter Parry, Cincinnati, OH (US); David Richard Esler, Gloversville, NY (US); Mahadevan Balasubramaniam, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 527 days.

(21) Appl. No.: 12/361,469

(22) Filed: Jan. 28, 2009

(65) Prior Publication Data
US 2010/0191502 A1 Jul. 29, 2010

(51) Int. Cl.
*G06F 11/00* (2006.01)
(52) U.S. Cl. ...................................... 702/155
(58) Field of Classification Search .................. 702/155, 702/150, 117, 118, 182–185
See application file for complete search history.

(56) References Cited

U.S. PATENT DOCUMENTS

| 3,502,967 | A | 3/1970 | Bridges et al. |
| 4,326,804 | A | 4/1982 | Mossey |
| 4,847,556 | A * | 7/1989 | Langley ................ 324/207.18 |
| 5,870,588 | A | 2/1999 | Rompaey et al. |
| 6,272,422 | B2 * | 8/2001 | Khalid et al. ................ 701/100 |
| 7,180,305 | B2 | 2/2007 | Andarawis et al. |
| 7,215,129 | B1 | 5/2007 | Andarawis et al. |
| 7,333,913 | B2 | 2/2008 | Andarawis et al. |
| 2003/0120460 | A1 | 6/2003 | Aubury |

(Continued)

FOREIGN PATENT DOCUMENTS

WO 00/38087 A1 6/2000
WO W02009004319 1/2009

OTHER PUBLICATIONS

U.S. Appl. No. 11/015,258, filed Dec. 17, 2004; Applicant: Christopher M. Verdier; Entitled: "System and Method for Measuring Clearance Between Two Objects".

(Continued)

*Primary Examiner* — Edward Raymond
(74) *Attorney, Agent, or Firm* — Fletcher Yoder, P.C.

(57) ABSTRACT

A processing system for clearance estimation in a rotating machine includes one or more sensors and one or more digital signal processors for calculating the estimated clearance. The processing system may include techniques for obtaining real-time clearance estimates and techniques for obtaining averaged clearance estimates. Aspects of the processing system may also include a method of switching between real-time clearance estimates and averaged clearance estimates depending on the operating conditions of the rotating machine. Other aspects of the processing system include the use of two digital signal processors: a first digital signal processor configured to receive signals from a clearance sensor and perform a first set of high speed processing tasks, and a second digital signal processor configured to receive signals from the first digital signal processor and perform a second set of lower speed processing tasks.

25 Claims, 6 Drawing Sheets

U.S. PATENT DOCUMENTS

| | | |
|---|---|---|
| 2003/0121010 A1 | 6/2003 | Aubury |
| 2006/0132147 A1 | 6/2006 | Balasubramaniam |
| 2006/0239813 A1 | 10/2006 | Shah et al. |
| 2007/0063697 A1 | 3/2007 | Mishkevich et al. |
| 2007/0128016 A1 | 6/2007 | Sasgupta et al. |

OTHER PUBLICATIONS

U.S. Appl. No. 12/118,904, filed May 12, 2008; Applicant: David Chan et al.; Entitled: "Clearance Estimation System and Method for a Rotary Machine".

U.S. Appl. No. 12/360,485, filed Jan. 27, 2009; Applicant: Emad Andarawis et al.; Entitled: "Automated Sensor Specific Calibration Through Sensor Parameter Download".

Donald L. Simon et al., "Sensor Needs for Control and Health Management of Intelligent Aircraft Engines," NASA, Prepared for the Turbo Expo 2004 sponsored by the American Society of Mechanical Engineers Vienna, Austria, Jun. 14-17, 2004.

\* cited by examiner

SYSTEM AND METHOD FOR CLEARANCE ESTIMATION BETWEEN TWO OBJECTS

BACKGROUND

The invention relates generally to clearance estimation techniques, and more particularly to a processing system for processing clearance signals for estimating a clearance between a stationary component and a rotary component of a rotating machine.

Various types of sensors have been used to measure the distance between two objects. In addition, such sensors have been used in various applications. For example, a turbine has a turbine blade that is disposed adjacent to a shroud. The clearance between the turbine blade and the shroud varies depending on the temperature of the turbine blade. For example, the clearance between the shroud and the turbine blade is greatest when the turbine is cold and gradually decreases as the turbine heats up. It is desirable that a gap or clearance between the turbine blade and the shroud be maintained for effective operation of the turbine. A sensor may be disposed within the turbine to measure the distance between the turbine blade and the shroud. The distance may be used to direct movement of the shroud to maintain the desired displacement between the shroud and the turbine blade.

In certain applications, a capacitance probe is employed to measure the clearance between two objects. The probe is located on one of the objects and measures a capacitance with respect to the other object for estimating the clearance between the two objects. Typically, signals from the probe are transmitted to a processing system for the estimation of clearance between the two objects. Unfortunately, such processing systems may involve long processing times for processing the signals and do not provide a real-time estimation of clearance between the objects.

Accordingly, a need exists for providing a processing system for clearance estimation that provides an accurate and real-time estimation of clearance between two objects.

BRIEF DESCRIPTION

Briefly, in accordance with one aspect of the present invention, a processing system for clearance estimation includes a first digital signal processor (DSP) configured to receive signals from a clearance sensor and to perform a first set of processing tasks using the signals from the sensor for estimating the clearance between two objects. The processing system also includes a second DSP configured to receive signals from the first DSP and to perform a second set of processing tasks using the signals from the first DSP, wherein a processing speed of the first DSP is relatively greater than a processing speed of the second DSP.

In accordance with another aspect of the present invention, a method of estimating clearance between stationary and rotating components of a rotating machine includes receiving signals from a clearance sensor and identifying individual elements of the rotating component. The method may also include tracking individual elements so that the characteristics of individual elements may be compared over time.

In accordance with another aspect of the present invention, a method of estimating clearance between stationary and rotating components of a rotating machine includes switching between clearance estimation techniques, depending on the operating conditions of the rotating machine.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

During certain stages of turbine operation, such as start-up, the spacing between the turbine and the casing may tend to change rapidly. Therefore, to decrease the likelihood of contact between the blades and the casing during these stages, the spacing maintained between the blades and the casing may be relatively large. This decreases the likelihood of contact between the casing and the blade, but also introduces noise into the spacing measurement signals. Because of the increased noise and because a real-time measurement of blade spacing is less important when the spacing is larger, techniques for measuring the spacing during these stages may take into account an average of several measured blade spacing signals. During steady-state operation, however, the efficiency of the turbine engine is increased by maintaining a smaller spacing between the blade and the casing. This may tend to increase the likelihood of contact between the blade and the casing, but may also decrease the noise in the spacing measurement signals. During steady-state operation, therefore, an accurate, real-time measurement of the blade spacing becomes more useful and also more feasible. Embodiments of the present invention enable real-time estimation of a clearance between two objects, such as a turbine blade and a casing. Furthermore, certain aspects of the present invention enable a measurement system to dynamically switch between the real-time measurement technique, i.e. the slicer technique, and the averaging measurement technique, i.e. the blade overlay technique.

Figure 1:
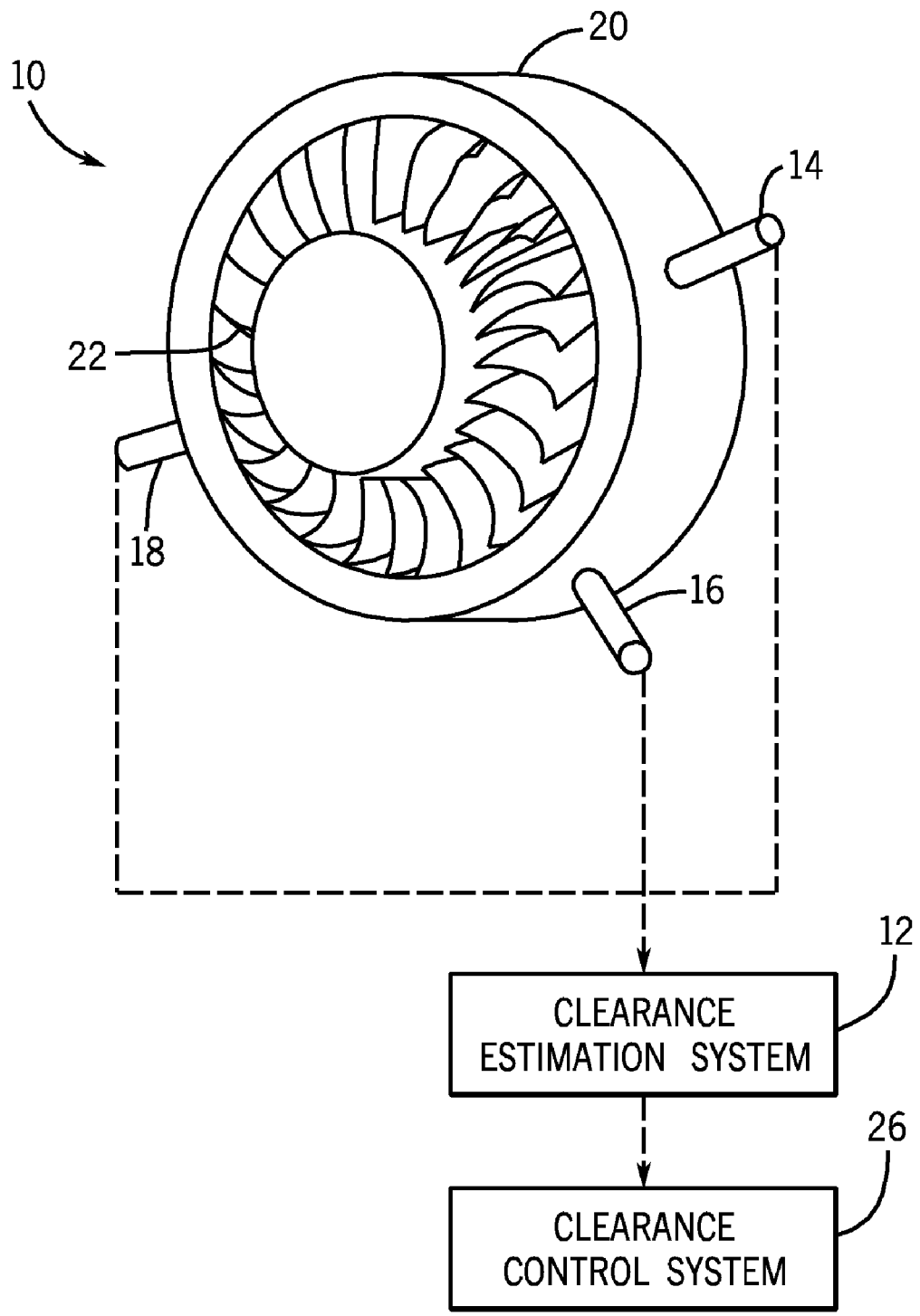
FIG. 1 is a diagrammatical perspective illustration of a portion of a turbine engine having a clearance estimation system in accordance with embodiments of the present technique.

As discussed in detail below, embodiments of the present technique function to provide an accurate measurement of clearance between two objects in various systems such as an aircraft engine, a steam turbine, and so forth. Referring now to the drawings, FIG. 1 is a diagrammatical perspective illustration of a portion of a turbine engine 10 having a clearance estimation system 12 in accordance with embodiments of the present technique. In the illustrated embodiment, the engine 10 includes a plurality of sensors 14, 16, and 18 for measuring the clearance between a casing 20 and a rotor having a plurality of blades 22 disposed within the casing 20. In certain embodiments, the rotary components 22 may be turbine blades, however, this is not intended to be a limitation of the present invention. In this embodiment, three sensors 14, 16, and 18 are employed at three different locations for clearance measurement between the casing 20 and the plurality of blades 22. However, a greater or lesser number of sensors may be used in other embodiments.

In the embodiment illustrated in FIG. 1, signals representative of the clearance are detected by the sensors 14, 16 and 18, and the signals are then transmitted to the clearance estimation system 12 to estimate a clearance between the casing 20 and the blades 22 at different locations. Further, the clearance estimation calculated by the clearance estimation system 12 is used for controlling the clearance between the casing 20 and the turbine blades 22 via a clearance control system 26. In this exemplary embodiment, the clearance estimation system 12 employs a multi-layer signal processing system that will be described in detail below.

Figure 2:
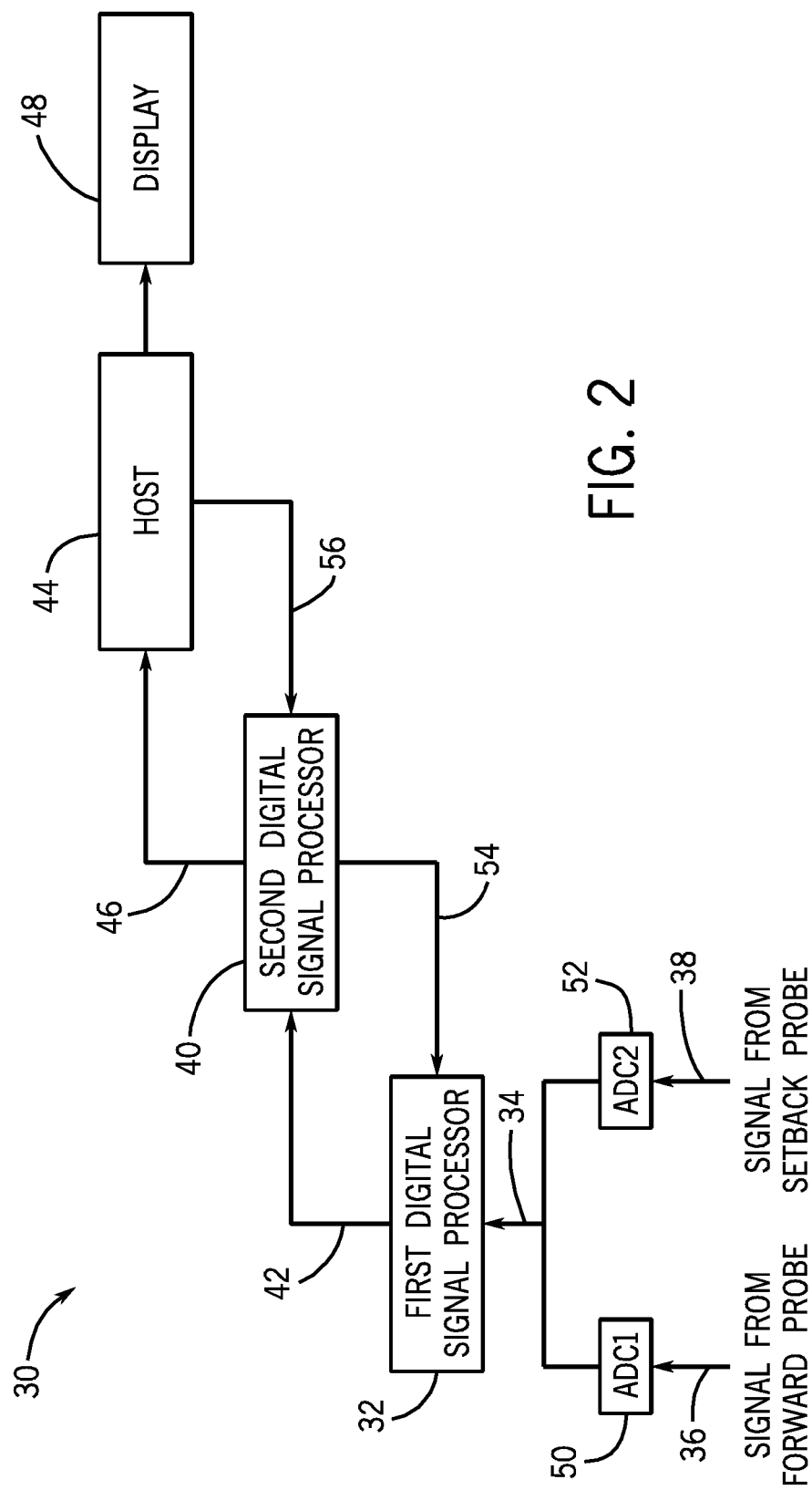
FIG. 2 is a diagrammatical illustration of a processing system employed in the clearance estimation system of FIG. 1 in accordance with embodiments of the present technique.

FIG. 2 is a diagrammatical illustration of a processing system 30 employed in the clearance estimation system 12 of FIG. 1 in accordance with embodiments of the present technique. In some embodiments, the processing system 30 may include a first DSP 32 configured to perform real-time sampling of an input signal 34 received from a clearance sensor such as sensors 14, 16 and 18 of FIG. 1 and perform a first set of processing tasks using the signal 34. In some embodiments, the first DSP 32 may be a field-programmable gate array (FPGA). Furthermore, the first DSP 32 may be a single-core or multi-core processor. The processing tasks performed by the first DSP 32 may include low level processing tasks. For example, the first DSP 32 may smooth the raw signal data received from the probes, analyze the data to identify individual blades 22, count blades to facilitate tracking of individual blades, track a rotational speed of the rotary machine, etc. Furthermore, the first DSP 32 may be configured to adaptively adjust an effective sampling rate of the signals 34 in response to a change in the rotational speed of the rotor. The processing tasks performed by the first DSP 32 will be described further below, in relation to FIGS. 5 and 6.

Because the first DSP 32 may be used to process high frequency signals, the first DSP 32 may operate with a relatively fast processing speed. For example, the first DSP 32 may operate with a processing speed of approximately one-hundred megahertz to several gigahertz. In certain embodiments, the processing speed of the first DSP 32 may be one gigahertz. Further, the first DSP 32 may or may not include floating point capability. To facilitate the real time processing of the input signal 34, the first DSP 32 may include two or more frame buffers, wherein one or more frames are utilized for processing the signals 34 and one frame is used for simultaneously sampling the signals. In certain embodiments, the first DSP 32 may include three frame buffers: two for processing and one for simultaneous signal sampling. In some embodiments, the first DSP may be a TMS320C6416T fixed-point digital signal processor available from Texas Instruments of Dallas, Tex.

As will be explained further in relation to FIGS. 3 and 4, the signal 34 received by the first DSP 32 may be a combination of the signals 36 and 38 that are generated by two or more probes within one of the sensors 14, 16, or 18. To receive both signals 36 and 38, the system 30 may include two analog-to-digital converters (ADCs) 50 and 52 for converting the analog signals 36 and 38 to digital signals. In one embodiment, the output of each ADC 50 and 52 may be sent to an external memory interface included in the first DSP 32. In other embodiments, the output of each ADC 50 and 52 may be sent to separate data input channels included in the first DSP 32. As will be explained further below, the first DSP 32 may be configured to extract certain sensed parameters from the signals 36 and 38, such as signal amplitudes and/or frequencies.

The processing system 30 also includes a second DSP 40 configured to receive signals 42 from the first DSP 32 and perform a second set of higher level processing tasks using the signals 42. In some embodiments, the second DSP 40 may be a field-programmable gate array (FPGA). Furthermore, the second DSP 40 may be a single-core or multi-core processor. The signals 42 received from the first DSP 32 may include the sensed parameters extracted from the input signal 34, the estimated rotary speed of the rotor, etc. The second set of processing tasks may include estimating the clearance based on the sensed parameters, as will be explained further below in relation to FIGS. 3 and 4. The second DSP 40 may then communicate the clearance estimation data and other data to the host system 44. Further, the second DSP 40 may also provide input parameters 54 to the first DSP 32. Examples of input parameters 54 include the desired clearance, the number blades 22, the desired measurement technique, sampling rates, etc.

Because the high frequency signal processing tasks may be performed by the first DSP 32, the processing speed of the second DSP 40 may be relatively slower than the processing speed of the first DSP 32. For example, the second DSP 40 may operate with a processing speed of approximately ten megahertz to several hundred megahertz. In certain embodiments, the processing speed of the second DSP 40 may be one-hundred megahertz. Further, the second DSP 40 may or may not include floating point capability. In some embodiments, the second DSP 40 may be a TMS320F2808 digital signal controller available from Texas Instruments, of Dallas, Tex.

Although, the present description describes the use of two digital signal processors, the division of processing tasks described above is not intended to be a limitation of the present description. Accordingly, the processing tasks described above may be distributed across the first and second DSPs 32 and 40 in any suitable manner. Moreover, in some embodiments, the processing tasks described above may be performed by a single digital signal processor or general purpose processor, rather than two separate processors. In such single-processor embodiments, the processor may be a single-core or multi-core processor. In multi-core embodiments, the processing tasks described herein as being performed by the first DSP 32 may be performed by a first core of the multi-core processor, while the processing tasks described herein as being performed by the second DSP 40 may be performed by a second core of the multi-core processor.

The processing system 30 may also include a host system 44 configured to receive signals 46 from the second DSP 40 corresponding with the clearance between the casing 20 and blades 22. The host system 44 may also be configured to provide inputs to the first and second DSPs 32 and 40, such as a sampling rate, a desired measurement technique for acquiring sensed parameters, or an operating condition of the rotary machine, for example. In certain embodiments, a user of the system may provide the input parameters 56. Additionally, a display 48 may be coupled to the host system 44 and may be configured to display information such as estimated clearance to a user of the system. In some embodiments, the host 44 may be a full authority digital engine control (FADEC). Additionally, the host 44 may send clearance estimations to the clearance control system 26, so that the clearance control system 26 may adjust the clearance accordingly. In some embodiments, some combination of the components described above may be implemented in an application-specific integrated circuit (ASIC).

The processing system 30 thus facilitates simultaneously sampling and processing of the signals from the sensors 14, 16 and 18 and provides a real-time estimation of clearance using such signals. The first and second DSPs 32 and 40 facilitate sampling and processing of such signals for a wide range of rpm of the rotor.

Figure 3:
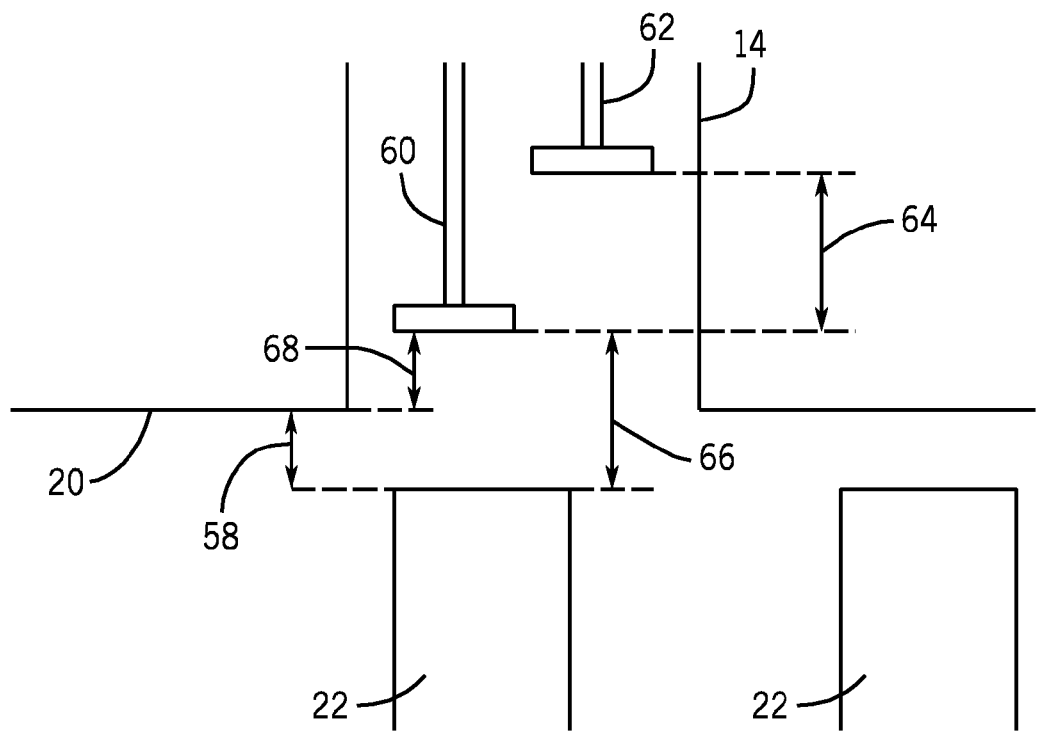
FIG. 3 is an illustration of a sensor used in the clearance estimation system of FIG. 1 in accordance with embodiments of the present technique.
Figure 4:
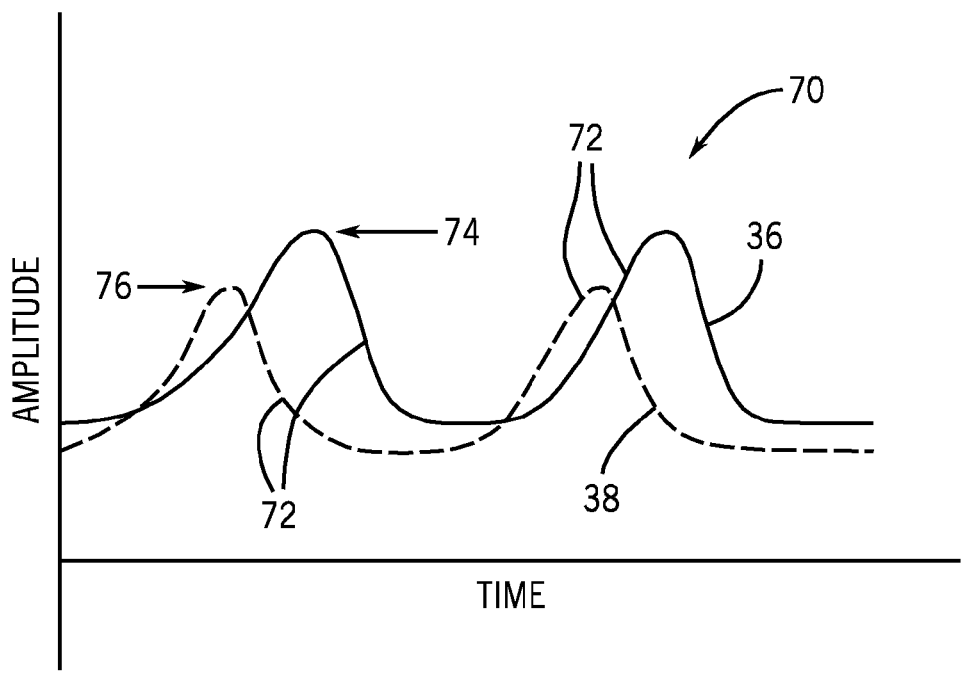
FIG. 4 is a graphical representation of exemplary signals received by the sensor of FIG. 3 in accordance with embodiments of the present technique.

Turning to FIGS. 3 and 4, a method of calculating a clearance estimate is illustrated. The clearance estimate is an estimate of the clearance 58 between the blades 22 and the casing 20. It should be noted that although FIG. 3 depicts blades 22 that are flat, embodiments may also include blades with raised edges, known as "squealers," or any other suitable blade shape. A squealer is a portion of the blade 22 that is closer to the shroud and therefore will tend to contact the shroud first in the event of contact between the blade and shroud. In some cases, contact between the blade and the shroud may cause deformation or shortening of the squealer. As shown in FIG. 3, the sensor 14 may include a forward probe 60, and a setback probe 62 configured to obtain a signal from which certain sensed parameters may be extracted. In other words, the probe 60 may be closer to the blades 22 than the probe 62. In some embodiments, the probes 60 and 62 may be capacitive probes and the sensed parameters may be capacitances. As such, the probes 60 and 62 may be coupled to a voltage source and the blades 22 may be coupled to ground. Because capacitance is a function of the distance between two charge carriers, the capacitance measured by the probe may facilitate a measurement of a probe-to-blade distance 66. In alternative embodiments, the sensors 40 and 42 may include microwave based sensors, or optical sensors, or eddy current sensors, and the sensed parameters may include impedance, or a phase delay, or an induced current, respectively.

Additionally, to allow a calibration of the measurements, the setback probe 62 may be positioned further from the blades 22 by a known setback distance 64 relative to the forward probe 60. As such, the estimated blade distance measured for probes 60 and 62 generally varies by the setback distance 64. Because the setback distance 64 is a known value, the readings from the probes 60 and 62 may be calibrated. Furthermore, the probe-to-casing distance 68 may also be a known value. Therefore, the clearance 58 may be calculated by subtracting the distance 68 from the measured probe-to-blade distance 66 for the probe 60.

Turning now to FIG. 4, a graph 70 shows exemplary capacitance signals measured by the probes 60 and 62. The graph 70 depicts a forward probe signal 36 measured by forward probe 60, and a setback probe signal 38 measured by setback probe 38. Each signal is composed of repeating waveforms 72 that are generated by the passing of the blades 22 adjacent the probes 60, 62. The measured capacitance will tend to peak at the point where the blade is closest to the probe. Therefore, the forward probe peak capacitance 74 represents the capacitance measured when the blade 22 is directly under the forward probe 60 and the setback probe peak capacitance 76 represents the capacitance measured when the blade 22 is directly under the setback probe 62. In some embodiments, the clearance may be a function of maximum and minimum capacitances as measured from the forward and setback probes. In other embodiments, the peak capacitance values alone may be used to calculate the clearance. In one embodiment, the probe-to-blade distance 66 may be estimated using the following formula:

$$S = D \cdot \frac{C_2}{C_1 - C_2}$$

Where S=the probe-to-blade distance 66; D equals the setback distance 64; C1 equals the forward probe peak capacitance 74; and C2 equals the setback probe peak capacitance 76. In other embodiments, more detailed calibration data may be gathered for individual sensors. Examples of other clearance estimation techniques may be found in the copending application titled, "System and Method for Measuring Clearance Between Two Objects," by Emad Andarawis, et al., application Ser. No. 11/015,258, which is hereby incorporated by reference for all purposes.

The signals 36 and 38 measured by the probes 60 and 62 may, at times, include a significant noise component. Therefore, to obtain the waveform data used in the clearance estimation described above, the processing system 30 may use different techniques of processing the signals, depending on the signal-to-noise ratio (SNR) of the signal. In some embodiments, the processing system 30 may include circuitry configured to obtain waveform data using both a "blade overlay" technique and a "slicer" technique. As will be explained further below, the blade overlay technique may be used to obtain waveform data for an average of several blades when the signals 36 and 38 exhibit a high level of noise, while the slicer based technique may be used to obtain waveform data for individual blades when the signals 36 and 38 exhibit a lower level of noise.

Embodiments of the blade overlay technique are described in the co-pending patent application "Clearance Estimation System and Method for a Rotary Machine," by David Chan, et al., application Ser. No. 12/118,904, which is hereby incorporated by reference for all purposes. In summary, the blade overlay technique involves averaging the waveforms 72 created by individual blades 22 over multiple periods of the measured signal. Accordingly, individual waveforms are identified so that the waveforms may be overlaid and averaged. In one embodiment, waveforms representative of individual blades may be identified by applying a fast Fourier transform (FFT) algorithm to the measured probe data to estimate the rotary speed of the blades, and using the estimated rotary speed of the blades to estimate positions of the blade centers relative to the measured waveform. The waveforms may then be extracted from the measured data by extracting measurement data on either side of the blade center. In averaging the waveforms, the noise component present in the waveforms may be reduced, allowing a more accurate measurement of the clearance. It will be recognized, however, that if the clearance changes during the averaging period, the estimated clearance will reflect an average clearance during the averaging period. Therefore, the precision of the blade overlay technique may be reduced during times wherein the clearance is changing rapidly. To mitigate this effect, the averaging period may be increased or decreased depending on how quickly the clearance is changing. Accordingly, the blade overlay technique includes calculating a "dwell time," which is a period during which the clearance does not change significantly. During periods of rapid clearance changes, the dwell time and thus the averaging period are reduced and fewer waveforms are included in the averaging, which provides a finer grained view of how the clearance is changing over time, but increases the level of noise remaining in the signal.

Figure 5:
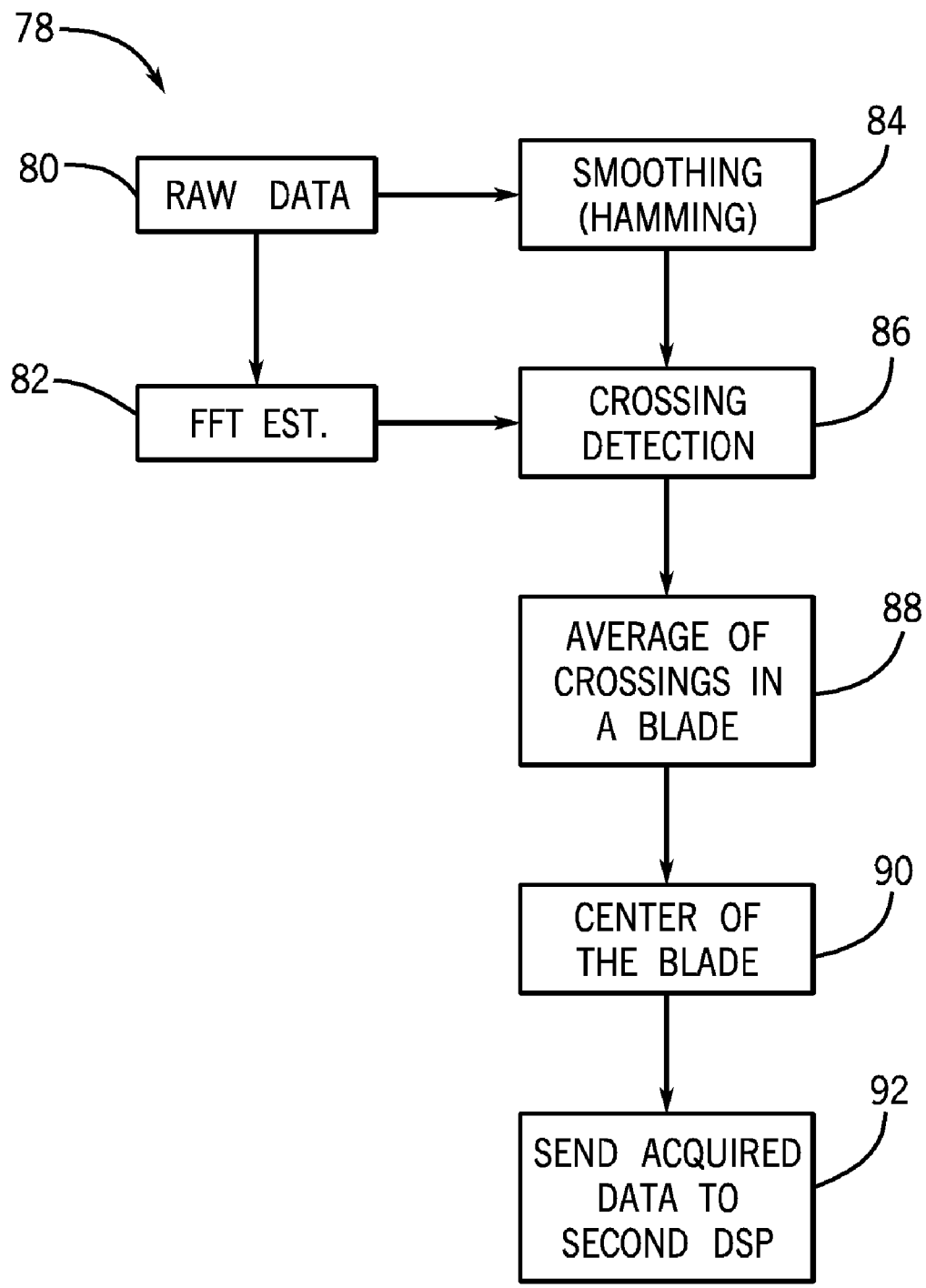
FIG. 5 is a diagrammatical illustration of an algorithm employed in the clearance estimation system of FIG. 2 in accordance with embodiments of the present technique.
Figure 6:
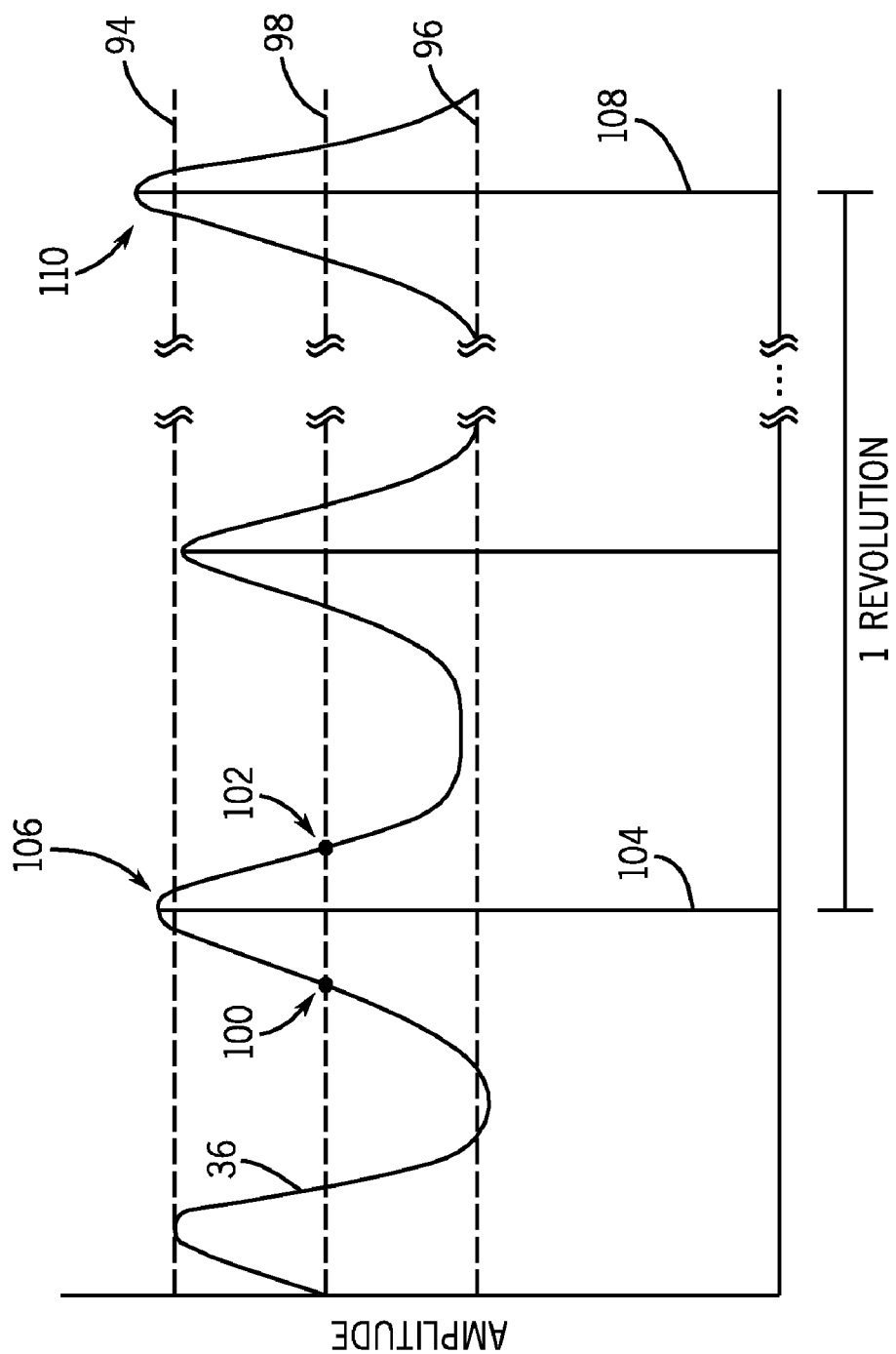
FIG. 6 is a graphical representation of an exemplary signal received by the sensor of FIG. 3 and processed by the algorithm illustrated in FIG. 5 in accordance with embodiments of the present technique.

Turning now to FIGS. 5 and 6, the slicer based technique will be described. FIG. 5 is a diagrammatical illustration of a slicer based algorithm 78 employed in the clearance estimation system 30 in accordance with embodiments. FIG. 6 graphically depicts a method of detecting individual blades as described in relation to steps 86, 88, and 90 of the algorithm 78 shown in FIG. 5.

Referring first to FIG. 5, the slicer based algorithm starts at step 80, wherein the first DSP 32 receives raw data from the forward and setback probes 60 and 62, representing the signals 36 and 38. The raw data may be received in digital format from one or more ADCs, as shown in FIG. 2. The raw sampling rate, i.e. the rate at which signal data is acquired by the first DSP 32, may be fixed during operation of the rotary machine and may be determined based upon a number of blades and the highest expected rotational speed of the rotor. As shown in step 84, the raw data may then be smoothed, to facilitate the detection of individual blade waveforms. The smoothing may be accomplished by applying a filtering algorithm to the raw data such as a low-pass or bandpass filter. After smoothing the raw data, the first DSP 32 may store the raw data to one or more frame buffers.

FIG. 6 is a graph of the smoothed signal data stored to a frame buffer and representing an exemplary signal 36. Although only the forward probe signal 36 is depicted, it will be appreciated that the setback probe signal 38 may be similarly processed to obtain measurements for the clearance estimation. As shown in FIG. 6, the "data window" of the frame buffer may include a number of sampling points sufficient to represent one full revolution of the blades 22 plus at least one repeating waveform created by a repeat measurement of one of the blades 22. Furthermore, in some embodiments, the first DSP 32 maintains an approximately constant data window size relative to the one full rotation of the blades 22. To maintain the same data window size relative to the rotational period of the blades 22, the effective sampling rate, i.e. the sampling rate at which the first DSP 32 stores samples to the frame buffer, may be adjusted to maintain an approximately constant data window size.

It will be appreciated that if the raw sampling rate of the signal 36 remains fixed during operation of the rotary machine, the number of samples that represent a full rotation of the blades 22 will depend on the rotary speed. Accordingly, the first DSP 32, may first determine an approximate rotary speed based on the raw data. In embodiments, the rotary speed may be approximated by applying a frequency transformation to the raw data, as shown in step 82. The frequency transformation refers to the application of a mathematical algorithm, such as an FFT algorithm, to the raw data that transforms the raw data from the time domain to the frequency domain. Based on the estimated rotary speed produced by the frequency transformation, the first DSP 32 may determine a decimation factor that determines what portion of the raw data samples are stored in the frame buffer. The decimation factor is a ratio of the number of samples in the original sample set to the number of samples in the reduced sample set. For example, if a decimation factor of 4 is used, the first DSP 32 may store only every forth data sample to the frame buffer, with intermediate samples being rejected. In alternative embodiments, rather than rejecting samples, several samples may be averaged, and the averaged data stored to the frame buffer, in which case, the decimation factor may determine the number of samples averaged. In this way, the effective sampling rate may be adjusted and an approximately constant data window may be maintained within the frame buffer, including a repeat waveform.

The decimation factor may be adjusted dynamically in response to a changing rotational speed of the turbine. As such, a memory location of the first DSP may store a decimation table that includes a table of rotational speeds associated with corresponding decimation factors suitable for each speed. The decimation factor may then be retrieved from memory based on the estimate rotational speed produced by the frequency transformation. In some embodiments, the decimation factor may be updated after each rotation of the rotary machine. For example, if the rotary machine is rotating at 60,000 revolutions per minute (RPM), the decimation factor may be updated at approximately one millisecond intervals. Additionally, the process for updating the decimation factor may include hysteresis to provide stability. As such, each decimation factor in the decimation table may be associated with two rotational speeds that define boundary conditions. In this embodiment, the decimation factor changes when the rotary speed crosses a boundary condition defined in the decimation table.

According to embodiments of the slicer based technique, the repeat waveform may be identified so that two measured waveforms are available for each blade. In order to identify the repeat waveform, the first DSP 32 may include data pertaining to the number of blades 22 included in the rotary machine. Additionally, the first DSP 32 may also be programmed to identify waveforms corresponding with individual blades 22. The first DSP 32 may then identify the repeat waveform by selecting or identifying a reference waveform and counting the number of waveforms from the reference waveform to the repeat waveform. Accordingly, the algorithm 78 includes steps for identifying waveforms in the signal 36 corresponding with individual blades 22 as shown in steps 86, 88 and 90.

At step 86, the first DSP 32 detects "signal crossings." As shown in FIG. 6, to detect signal crossings the first DSP 32 may calculate an average high capacitance 94 and an average low capacitance 96 based on the signal 36. From the average high capacitance 94 and average low capacitance 96, an intermediate level capacitance 98 may be obtained. The intermediate level capacitance 98 may, for example, be a mid level capacitance obtained by averaging the high capacitance 94 and the low capacitance 96. In other embodiments, a weighted averaging may be employed to obtain an intermediate level capacitance 98 at any suitable level between the high capacitance 94 and the low capacitance 96. The first DSP 32 then identifies signal crossings 100, 102 which occur each time that the signal 36 crosses over the intermediate level capacitance 98. In the embodiment shown in FIG. 6, every two crossings represent a single blade. In other embodiment, however, each blade may be represented by a different number of signal crossings. For example, in embodiments in which the blade 22 includes raised edges, or squeelers, the waveforms 72 may be 'M'-shaped, in which case each blade may be represented by four signal crossings, depending on the height of the intermediate level capacitance 98. The signal crossings may then be used by the first DSP 32 to count blades and, therefore, identify the repeat waveform.

Additionally, at steps 88 and 90, the signal crossings may also be used to obtain the peak capacitance 106 used for estimating the clearance. As shown in FIG. 6, the average, or midpoint, between the two blade crossings 100 and 102 may be calculated to find the blade center 104. The amplitude of the signal 36 at the blade center 104 may then be used to represent the peak capacitance 106. The above process may also be performed for the repeat waveform to find the blade center 108 and the peak capacitance 110. The resulting information may then be sent to the second DSP 32 and used to estimate clearance values for each waveform. The clearance calculated for the first waveform may serve as a known reference by which to compare the clearance calculated for the repeat waveform. In this way, small changes in clearance may be quickly identified.

Additionally, because the first DSP 32 identifies a blade repetition, the first DSP 32 is able to determine the time taken for one full revolution of the rotary machine. This data may be used to calculate a more accurate rotary speed. The more accurate rotary speed may be utilized to dynamically change the sampling rate, or the decimation factor applied to the signal 36. Furthermore, because two or more waveforms may be associated with a particular blade, changes in the shape of a particular blade may be detected. For example, changes in the squealer height of a particular blade may be detected. Changes in the squealer height may be used to indicate that contact between the casing and the blade has occurred.

Returning to FIG. 5, at step 92 the sensed parameters acquired by the first DSP 32 as described above may then be transferred to the second DSP 40. The second DSP 40 may then calculate various parameters related to the signal 36 such as the estimated clearance, change in clearance, rotary speed, etc. Additionally, data regarding the shape of the repeat waveform as compared to the reference waveform may be used to identify changes in the shape of the blades 22. For example, changes in squealer height may be estimated. Data calculated by the second DSP 40 may then be sent to the host 44 and/or the clearance control system 26, as described in relation to FIG. 2.

Figure 7:
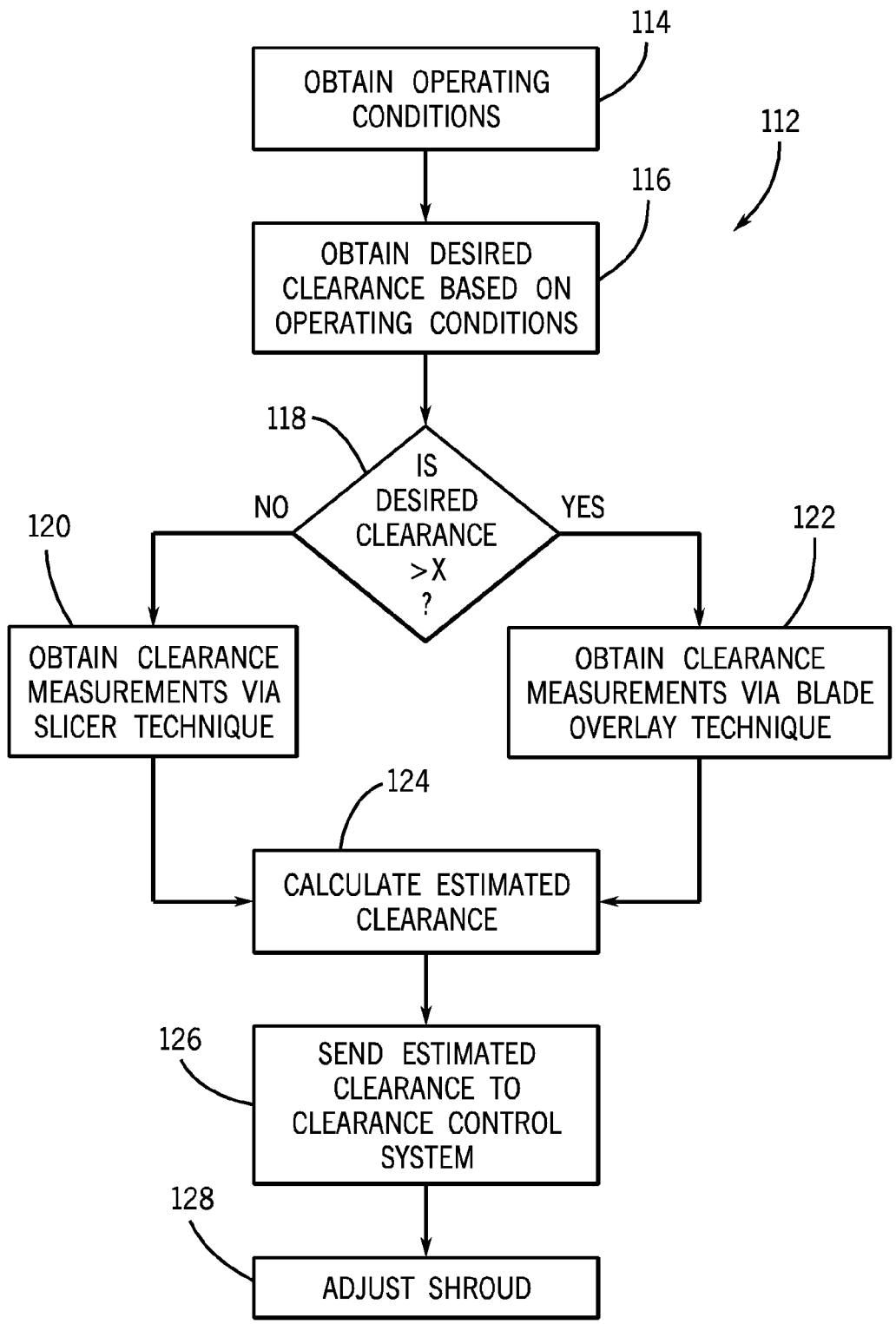
FIG. 7 is a diagrammatical illustration of a method for switching between two different algorithms employed in the clearance estimation system of FIG. 2.

Turning now to FIG. 7 a process 112 for selecting between the blade overlay technique and the slicer based technique is depicted. It will be appreciated that, the slicer based technique and the blade overlay technique may each have certain advantages that may be more beneficial during different modes of operation. In the case of a jet turbine during takeoff, for example, the clearance may tend to decrease rapidly as the blades 22 heat up and expand. Additionally, vibrations caused during takeoff may cause the clearance to change rapidly. To avoid a rub during takeoff, the desired clearance may be set to a relatively large value. This may tend to decrease the SNR of the signals 36 and 38. Both the increased clearance and the decreased SNR may make the blade overlay technique preferable during takeoff.

Conversely, during cruising conditions the blades may be more stable due to reduced vibrations and reduced blade temperature variations. Because the likelihood of a rub may be lessened during cruising conditions, the desired clearance may be set to a relatively small value to increase the efficiency of the turbine. The smaller clearance may increase the SNR of the signals 36 and 38, making the blade overlay technique less beneficial. Additionally, because the clearance is generally smaller, detection of small, rapid changes in clearance becomes more important. Therefore, during cruising conditions, the slicer based technique may be more beneficial.

Accordingly process 112 provides one exemplary method of switching between the blade overlay technique and the slicer based technique depending on operating conditions of the rotary machine. Process 112 starts at step 114, wherein the operating conditions of the turbine are detected. The operating conditions may include rotary speed, rotary acceleration, temperature, vibration intensity, or any other value that may affect the desired clearance. In various embodiments, the operating conditions may be determined by the first DSP 32, the second DSP 40, or the host 44, and may be based on input from an operator of the turbine engine 10.

Next, at step 116, the desired clearance may be obtained based on the operating conditions detected in step 114. For example, as described above, the desired clearance may be larger during periods of rapid acceleration and smaller during periods of relatively steady state conditions. The desired clearance may then be used to determine which measurement technique to use.

Next, at step 118, it is determined whether the desired clearance is greater than a clearance threshold "X." If the desired clearance is lower than the threshold, then clearance measurements are obtained at step 120 according to the slicer based technique described above. If, however, the desired clearance is greater than the threshold, then clearance measurements are obtained at step 122 according to the blade overlay technique. In alternate embodiments, the choice of measurement technique may be based on characteristics of the measured signals 36 and 38. For example, in some embodiments, the choice of measurement technique may be based on the SNR of the measured signals 36 and 38. In other embodiments, the estimated clearance calculated for a previous iteration of the clearance estimation process may be used in place of the desired clearance obtained in step 116.

Next, at step 124, based on the clearance measurements obtained in either step 120 or step 122, the estimated clearance is calculated as described in FIGS. 3 and 4. The estimated clearance is then sent to the clearance control system at step 126. In response to the estimated clearance, the clearance control system may then, at step 128, adjust the spacing between the casing 20 and the blades 22, to maintain the desired clearance. In some embodiments, the spacing is adjusted by changing the size of the shroud. In other embodiments, the spacing may be adjusted by changing the position of the blades.

In certain embodiments, the processes described above may be implemented in a general purpose computer. As such, the processes described above may be embodied in software code stored in a tangible medium, such as a computer hard drive or software disk.

The various aspects of the method described hereinabove have utility in different applications. For example, the technique illustrated above may be used for measuring the clearance between rotating and static components in an aircraft engine. The technique may also be used in certain other applications, for example, for measuring clearance between objects in gas turbines, steam turbines, and so forth. As noted above, even more generally, the method described herein may be advantageous for providing accurate measurement of clearance between objects through sensors by employing a real-time processing system having fast and slow processors performing different set of tasks. Further, the technique is particularly advantageous to provide a processing system for accurate clearance measurement of parts, even in operation and over extended periods of time, enabling better clearance control in parts while in operation.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for clearance estimation, comprising:
one or more processors configured to receive signals from a clearance sensor and perform a first and second set of processing tasks using the signals from the clearance sensor, the first set of processing tasks configured to extract sensed parameters used to calculate an estimated clearance between two objects, and the second set of processing tasks configured to use the sensed parameters to calculate the estimated clearance;
wherein the first set of processing tasks includes adaptively adjusting an effective sampling rate of the signals from the clearance sensor in response to a change in a rotational speed of the rotating machine.

2. The system of claim 1, wherein the one or more processors includes a first digital signal processor configured to perform the first set of processing tasks and a second digital signal processor configured to perform the second set of processing tasks, and wherein the first digital signal processor is configured to perform real-time sampling of the signals from the clearance sensor.

3. The system of claim 1, wherein the two objects comprise a stator and a rotor of a rotating machine.

4. The system of claim 3, wherein the rotating machine comprises aircraft engine, a steam turbine or a gas turbine.

5. The system of claim 3, wherein the first set of processing tasks comprises estimating the rotational speed of the rotating machine, storing the received signals to a frame buffer, identifying individual rotary components, identifying a repeat waveform, identifying peak amplitudes, or combinations thereof.

6. The system of claim 2, wherein a processing speed of the first digital signal processor is relatively greater than a processing speed of the second digital signal processor.

7. The system of claim 2, wherein the first digital signal processor selectively employs a slicer based technique and a blade overlay technique for the task of extracting sensed parameters from the signals.

8. The system of claim 7, wherein the first digital signal processor is configured to switch between the slicer based technique and the blade overlay technique based on a measured rotational speed of the rotating machine, a signal-to-noise ratio of the signals, an estimated clearance, or a combination thereof.

9. The system of claim 1, wherein the second set of processing tasks comprises calculating an estimation of the clearance, determining whether to use the slicer based technique or the blade overlay technique, communicating the estimation of the clearance from the second digital signal processor to a host, or a combination thereof.

10. The system of claim 1, wherein the clearance sensor comprises a capacitive sensor.

11. The system of claim 1, wherein the clearance sensor comprises at least two probe tips for facilitating self-calibration of the sensor.

12. The system of claim 2, wherein the first digital signal processor comprises a first frame and at least one other frame and wherein the at least one other frame is utilized for processing the signals and the first frame is utilized for simultaneous sampling of the signals.

13. A computer implemented method for clearance estimation, comprising:
acquiring a signal from a clearance sensor; wherein the signal is representative of a clearance between one or more rotary components and a casing of a rotary machine, and the signal comprises waveforms created by the passage of the rotary components past the clearance sensor;
calculating an average low amplitude of the waveforms;
calculating an average high amplitude of the waveforms;
calculating a intermediate level amplitude based on the average low amplitude and the average high amplitude;
identifying a pair of signal crossings representing instances wherein an amplitude of the signal crosses the intermediate level amplitude; and
determining a center of one of the rotary components based on the signal crossings.

14. The method of claim 13, comprising storing the acquired signal in a frame buffer in a digital representation and adaptively adjusting the effective sampling rate of the signal so that the frame buffer includes a repeat measurement of at least one of the one or more rotary components.

15. The method of claim 14, wherein adaptively adjusting the effective sampling rate comprises applying a frequency transformation to the signal to determine a rotational speed of the rotary machine and determining a decimation factor based on the rotational speed.

16. The method of claim 13, comprising identifying a reference waveform corresponding with a first rotary component and counting the number of signal crossings to identify a repeat waveform corresponding with a repeat measurement of the first rotary component.

17. The method of claim 13, comprising averaging the signal crossings to identify a center of the waveforms and acquiring the signal amplitude at the center of the waveforms.

18. The method of claim 13, wherein the clearance sensor is a capacitive probe and the signal corresponds with a capacitance between the sensor and the rotary components.

19. A method, comprising:
obtaining one or more operating conditions of a rotary machine having a clearance between a casing and one or more rotary components;
determining a desired clearance between the casing and the one or more rotary components based on the one or more operating conditions;
determining a measurement technique based on the desired clearance, wherein the measurement technique is used to obtain measured parameters for calculating a clearance estimate in real-time, and the clearance estimate represents the actual clearance;
calculating the clearance estimate in real-time based on the measured parameters; and
adjusting the actual clearance based on the clearance estimate.

20. The method of claim 19, wherein determining the measurement technique comprises choosing between a blade overlay technique and a slicer based technique.

21. The method of claim 19, wherein the operating conditions of the rotary machine comprise a rotary speed, a rotary acceleration, a power output, a vibration intensity, or a combination thereof.

22. The method of claim 19, wherein adjusting the actual clearance comprises sending the clearance estimate to a clearance control system.

23. A rotary machine, comprising:
a rotating component spaced apart from a stationary component;
a sensor disposed on the stationary component and configured to generate a plurality of signals corresponding to the rotating component of the rotary machine; and a processing unit configured to analyze the plurality of signals to estimate a clearance between the stationary and rotating components, wherein the processing unit comprises first and second digital processors configured to perform first and second sets of processing tasks using the signals, and wherein a processing speed of the first digital signal processor is relatively greater than a processing speed of the second digital signal processor.

24. The rotary machine of claim 23, further comprising a clearance control system coupled to the processing unit for controlling the clearance between the stationary and rotating components based upon the clearance estimated by the processing unit.

25. The rotary machine of claim 23, wherein the rotary machine comprises an aircraft engine, a steam turbine or a gas turbine.

\* \* \* \* \*